United States Patent [19]

Benes et al.

[11] 3,849,604

[45] Nov. 19, 1974

[54] TIME-SLOT INTERCHANGER FOR TIME DIVISION MULTIPLEX SYSTEM UTILIZING ORGAN ARRAYS OF OPTICAL FIBERS

[75] Inventors: Vaclav Edvard Benes, Berkeley Heights; Michel Albert Duguay, Summit, both of N.J.

[73] Assignee: Bell Telephone Laboratories, Incorporated, Murray Hill, N.J.

[22] Filed: Sept. 28, 1973

[21] Appl. No.: 401,632

[52] U.S. Cl. .......................... 179/15 AQ, 250/199

[51] Int. Cl. .......................... H04j 3/00, H04b 9/00

[58] Field of Search ......... 179/18 GF, 15 A, 15 AQ, 179/15 R; 250/199; 178/69.5 R; 350/161

[56] References Cited

UNITED STATES PATENTS

| | | | |
|---|---|---|---|
| 3,590,248 | 6/1971 | Chatterton | 250/199 |
| 3,604,936 | 9/1971 | Kompfner | 250/199 |
| 3,714,437 | 1/1973 | Kinsel | 250/199 |
| 3,717,769 | 2/1973 | Hubbard | 250/199 |

*Primary Examiner*—Kathleen H. Claffy
*Assistant Examiner*—Joseph A. Popek
*Attorney, Agent, or Firm*—M. J. Urbano

[57] ABSTRACT

In a time-slot interchanger (TSI) an electrical time-multiplexed PCM signal, comprising sequential multiplexed words, is utilized to drive a laser which generates the optical analog of the incoming time-multiplexed electrical signal. Each pulse of the optical analog signal is divided into a plurality of optical subpulses propagating along spatially separate paths to the input of an organ array of optical fibers, i.e., a plurality of fibers cut to different lengths so that the difference in length between functionally adjacent (i.e., lengthwise consecutive) fibers is uniform. At the input of the organ array there are disposed a plurality of optical gates. A separate one of the gates is in registration with the input end of each optical fiber. These gates are under the control of a central processing unit which opens selected ones of the gates at predetermined times, typically for a time period equal to the duration of a word. The output ends of the fibers of the organ array are optically coupled to a photodetector. The output of the detector is an electrical time-multiplexed signal in which the words are permuted in accordance with a predetermined sequence generated by the timing of the control pulses from the central processing unit. Also described is a TSI for use in an optical communication system as well as a switching network utilizing the TSI.

7 Claims, 4 Drawing Figures

TIME-SLOT INTERCHANGER FOR TIME DIVISION MULTIPLEX SYSTEM UTILIZING ORGAN ARRAYS OF OPTICAL FIBERS

CROSS REFERENCE TO RELATED APPLICATIONS

The following applications were filed concurrently with this application: (1) Ser. No. 401,635 (M. A. Duguay Case 14) entitled "Optical Apparatus Utilizing Organ Arrays of Optical Fibers," and (2) Ser. No. 401,633 (M. A. Duguay-J. K. Galt Case 15-4) entitled "Optical Switching Networks Utilizing Organ Arrays of Optical Fibers."

BACKGROUND OF THE INVENTION

This invention relates to time-division multiplex systems and, more particularly, to a time-slot interchanger (TSI) utilizing an organ array of optical fibers for use in such systems.

As described by R. S. Krupp and L. A. Tompko in an article entitled "Switching Network of Planar Shifting Arrays," *Bell System Technical Journal*, Vol. 52, pages 991–1007 (1973), a switching machine may be considered to consist of three major subdivisions: a switching network, which makes cross connections for each incoming signal (e.g., subscriber call); a controller, used to direct the operation of the network; and finally interface means used to interconnect the network, the controller and external circuits. In their paper, Krupp et al discuss a time-division digital switching network constructed from two basic building blocks: a time-slot interchanger, the only actual switching element in the system, and a mass serial-to-parallel converter, which performs time-space mapping and thereby acts as the interconnection links between successive stages of time-slot interchangers. They point out that networks of arbitrary size and blocking probability can be fashioned from these two building blocks. Furthermore, Krupp et al suggest that these basic building blocks may be realized in the form of planar shifting arrays which are basically shift registers that can perform shifting operations in two orthogonal directions. Although they recognize that the requirements of such planar shifting arrays are consistent with those of the emerging technologies of magnetic bubble and charge-coupled devices, the systems which they describe are not restricted to implementation by any particular type of device.

SUMMARY OF THE INVENTION

Our invention is directed primarily to the implementation of one of the foregoing basic building blocks, the time-slot interchanger, by means of a suitably gated organ array of optical fibers.

An "organ" array comprises a plurality of optical fibers cut to different lengths so that difference in length between functionally adjacent (i.e., lengthwise consecutive) fibers is uniform. Preferably, one end of each fiber is terminated in an input plane and the opposite end of each fiber is terminated in an output plane. The input and output planes need not be parallel to one another and need not be "planar" in the geometric sense since the fiber ends can terminate on a curved surface or in an incoherent array of points. A plurality of optical pulses, which are simultaneously coupled to separate ones of the fibers at the input plane, propagate along the fibers and undergo different transit time delays due to the different lengths of the fibers. Consequently, pulses in different fibers arrive at the output plane at different times.

In a time-slot interchanger in accordance with an illustrative embodiment of our invention, an electrical time-multiplexed PCM signal, comprising a plurality $j$ of multiplexed "words" in each frame is utilized to drive a laser which generates an optical analog of the incoming time-multiplexed electrical signal. Each pulse of the optical analog signal is divided into a plurality of at least $(2j - 1)$ optical sub-phases propagating along spatially separate paths to the input plane of an organ array of optical fibers. At the input plane of the organ array there are disposed a plurality of at least $(2j - 1)$ optical gates. A separate one of the gates is in registration with the input end of each optical fiber. These gates are under the control of a central processing unit which opens selected ones of the gates at predetermined times, typically for a time period equal to the duration of a word. The output ends of the fibers of the organ array are optically coupled to a photodetector. The output of the detector is an electrical time-multiplexed signal in which the words are permuted in accordance with a predetermined sequence generated by the timing of the control pulses from the central processing unit.

In operation, the central processing unit generates control pulses which open selected ones of the gates at appropriate times so that preselected words are coupled to preselected optical fibers; i.e., preselected words are given preselected time delays, thereby permuting in time the words which arrive at the input of the photodetector. The output of the photodetector is the electrical analog of the permuted optical signal.

Also described hereinafter is a TSI for use in an optical communication system as well as a switching network utilizing our time-slot interchangers.

BRIEF DESCRIPTION OF THE DRAWING

Our invention, together with its various features and advantages, can be easily understood from the following more detailed description taken in conjunction with the accompanying drawing in which.

DETAILED DESCRIPTION

In the description which follows, numerical parameters are utilized for the purposes of illustsration only and are not intended to be limitations on the scope of the invention.

Figures 1, 2, 3:
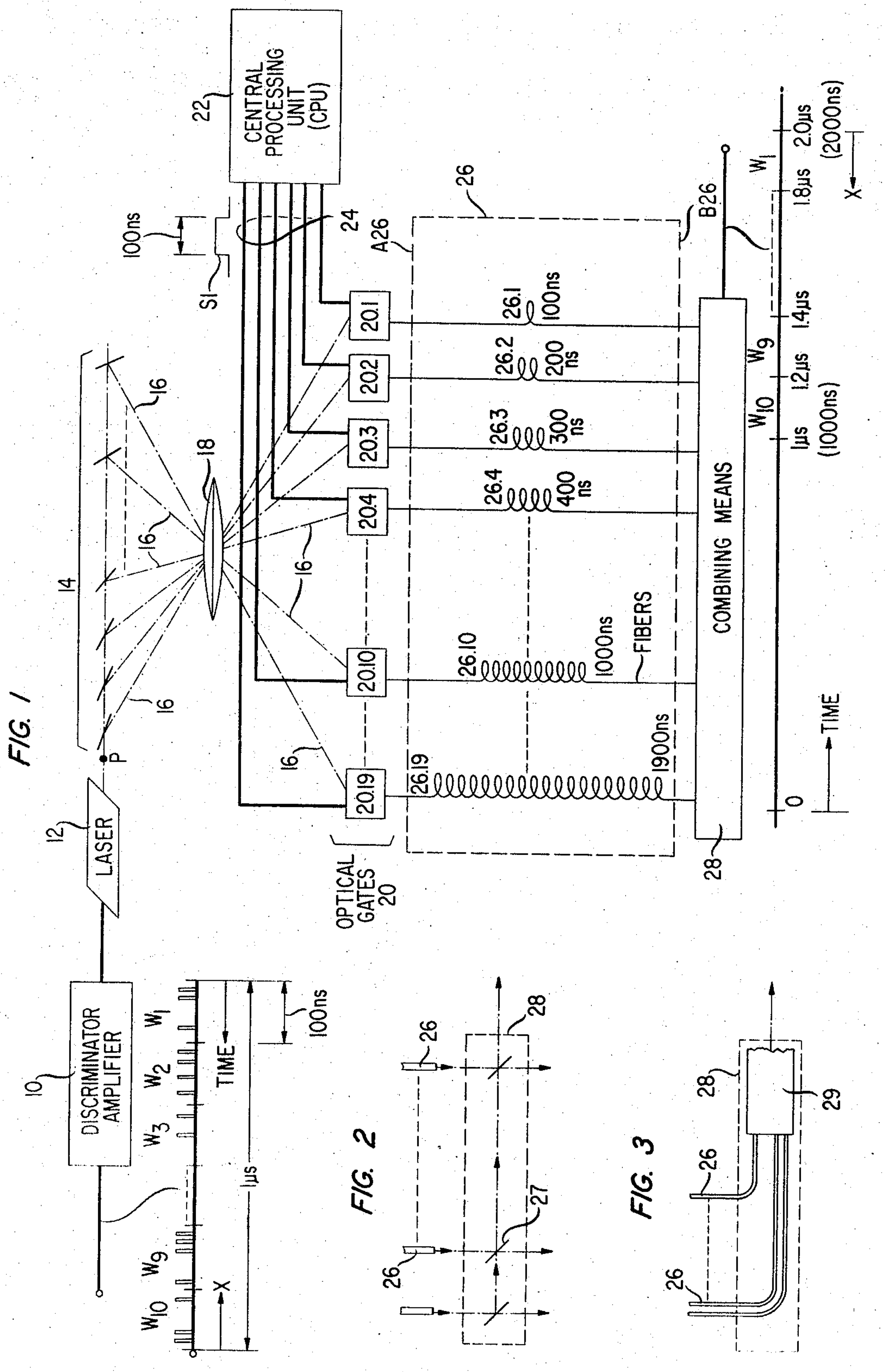
FIG. 1 is a block diagram showing a time-slot interchanger in accordance with an illustrative embodiment of our invention.
FIGS. 2 and 3 show alternative means for combining the pulses emerging from the organ array of FIG. 1 onto a single optical output path.

Turning now to FIG. 1, there is shown a time-slot interchanger, in accordance with an illustrative embodiment of our invention, for permuting the words of an electrical time-multiplexed PCM signal. Illustratively, the incoming signal (i.e., frame) is composed of j sequential time-multiplexed words designated $W_1$ $W_2$ $W_3$...$W_{10}$ for $j = 10$. Each word or time slot contains a coded sequence of binary pulses. Illustratively, each time slot is 100 nanoseconds in duration and adjacent pulses are separated by 10 ns.

This time-multiplexed PCM electrical signal is applied to a discriminator-amplifier 10 which typically amplifies and reshapes the electrical pulses which are then used to drive a laser 12, illustratively an AlGaAs double heterostructure junction laser of the type described by I. Hayashi in U.S. Pat. No. 3,758,875 (Case 4), issued on Sept. 11, 1973, but adapted for pulsed rather than c.w. operation. The output of laser 12 is an optical analog of the incoming electrical signal. Each optical pulse in each word is then divided into a plurality of at least $(2j - 1)$ optical sub-pulses propagating along spatially separate optical paths. More specifically, the optical analog signal is applied to a plurality of at least $(2j - 1)$ tandem beam splitters 14 which are oriented to deflect a portion of each optical pulse into at least $(2j - 1)$ spatially separate paths 16. By means well known in the art, the reflectivity and transmission characteristics of the beam splitters may be designed so that the optical sub-pulses are each of substantially the same intensity.

The optical sub-pulses propagating along the spatially separate paths 16 are then focused through lens means 18 onto separate ones of a plurality of at least $(2j - 1)$ optical gates 20. Preferably lens means 18 and gates 20 are separated by a distance approximately equal to the focal length of lens means 18. In this case, we have assumed that $j = 10$, therefore at least nineteen gates are utilized. Each gate 20 is connected along a separate electrical bus 24 to a central processing processing unit 22. The CPU 22 is capable of generating on selected ones of the buses 24 control pulses S1 of duration approximately equal to the duration of a word or time slot (e.g., 100 ns). In addition, the CPU 22, which typically includes a computer, is programmed to generate the control pulses S1 at predetermined times and on predetermined buses 24 in order to open predetermined ones of the gates 20 at predetermined times.

The gates 20 are optically coupled to an organ array 26 comprising at least $(2j - 1)$ optical fibers which are cut to different lengths so that the difference in length between functionally adjacent (i.e., lengthwise consecutive) fibers is uniform. Preferably, one end of each fiber is terminated in an input plane A26 and the opposite end of each fiber is terminated in an output plane B26. For example, in FIG. 1 the array 26 comprises nineteen optical fibers 26.1, 26.2...26.19 which are cut to produce time delays in increments of 100 ns ranging from 100 ns to 1,900 ns. That is, fibers 26.1, 26.2, 26.3...26.19 produce delays on 100 ns, 200 ns, 300 ns...1,900 ns. In FIG. 1 the fibers are shown schematically as straight lines with one or more loops to designate their different lengths. The inputs of the optical gates 20 are in registration with separate optical paths 16 and the outputs of the gates 20 are in registration with separate optical fibers 26. The output ends of the fibers 26 (i.e., output plane B26) are optically coupled to combining means 28; e.g., a photodetector which converts optical pulses transmitted through the interchanger to electrical signals at its output. Where the output path is optical, however, combining means 28 might comprise, for example, an array of partially reflective, partially transmissive mirrors 27 oriented to deflect a portion of the optical sub-pulses emerging from output plane B16 into collinear paths as shown in FIG. 2. Alternatively, the output ends of fibers 26 could be coupled directly to a relatively larger diameter fiber 29 as shown in FIG. 3.

It should be noted that in making the differential delay between the fibers of array 26 uniform, one skilled in the art should take into account differential delays introduced by other components (e.g., beam splitters 14) in the apparatus. Thus, the delay designations given to the fibers of array 26 represent the total delay for each path from point p (at the input of the beam splitters 14) to output plane B26 (i.e., the input of combining means 28).

In order to demonstrate the operation of our time-slot interchanger, assume, as before, a 1 μs frame of ten words each 100 ns in duration. Under appropriate control from the CPU 22, our time-slot interchanger can distribute any word in the frame into any 100 ns time slot. For example, to invert the frame $W_1W_2...W_{10}$, i.e., to produce the sequence $W_{10}W_9...W_1$ between $t = 1$ μsec to $t = 2$ μsec as shown at the output of combining means 28, the gates 20 would be opened at the times indicated in the following example:

EXAMPLE I

| WORD | TIME SLOT | GATE OPENED | GATE TIMING |
|---|---|---|---|
| $W_{10}$ | 1.0–1.1 μs | 20.1 | $t = 0.9$ μs |
| $W_9$ | 1.1–1.2 μs | 20.3 | $t = 0.8$ μs |
| $W_8$ | 1.2–1.3 μs | 20.5 | $t = 0.7$ μs |
| $W_7$ | 1.3–1.4 μs | 20.7 | $t = 0.6$ μs |
| $W_6$ | 1.4–1.5 μs | 20.9 | $t =$ μs |
| $W_5$ | 1.5–1.6 μs | 20.11 | $t = 0.4$ μs |
| $W_4$ | 1.6–1.7 μs | 20.13 | $t =$ μs |
| $W_3$ | 1.7–1.8 μs | 20.15 | $t = 0.2$ μs |
| $W_2$ | 1.8–1.9 μs | 20.17 | $t = 0.1$ μs |
| $W_1$ | 1.9–2.0 μs | 20.19 | $t = 0$ |

Only 10 of the 19 gates are utilized. In fact, every other gate is utilized, which corresponds to placing the time slots on fibers which are separated from one another by a 200 ns delay. The timing, therefore, takes into account the inherent 100 ns delay between adjacent words in the incoming time-multiplexed signal. It should also be noted that the permuted frame arrives at the output of means 28 delayed by 1 μs (the frame duration) with respect to the input frame.

Alternatively, any arbitrary, but predetermined word sequence, such as $W_2W_3W_6W_1W_4W_7W_8W_9W_5W_{10}$, can be generated by opening gates 20 at the times indicated in the following example:

EXAMPLE II

| WORD | TIME SLOT | GATE OPENED | GATE TIMING |
|---|---|---|---|
| $W_2$ | 1–1.1 μs | 20.9 | $t = 0.1$ μs |
| $W_3$ | 1.1–1.2 μs | 20.9 | $t = 0.2$ μs |
| $W_6$ | 1.2–1.3 μs | 20.7 | $t = 0.5$ μs |
| $W_1$ | 1.3–1.4 μs | 20.13 | $t = 0$ |
| $W_4$ | 1.4–1.5 μs | 20.11 | $t = 0.3$ μs |
| $W_7$ | 1.5–1.6 μs | 20.9 | $t = 0.6$ μs |
| $W_8$ | 1.6–1.7 μs | 20.9 | $t = 0.7$ μs |
| $W_9$ | 1.7–1.8 μs | 20.9 | $t = 0.8$ μs |
| $W_5$ | 1.8–1.9 μs | 20.14 | $t = 0.4$ μs |
| $W_{10}$ | 1.9—2.0 μs | 20.10 | $t = 0.9$ μs |

Note that, as in Example II for words $W_7$, $W_8$ and $W_9$, the same gate (e.g., 20.9) may have to be opened by the CPU more than once for 100 ns each time. Another example is the identity permutation which is obtained by opening gate 20.10 for 100 ns 10 times in a row; i.e., for 1 μsec from $t = 0$ to $t = 1$ μsec. The signal $W_1W_2W_3...W_{10}$ then appears at the output of photodetector 28 between $t = 1$ $\mu$sec and $t = 2\mu$sec.

In general, given a frame of duration $t_s$ containing $j$ words $W_1W_2...W_j$, each word of duration $t_w$, then in order to transfer the $k^{th}$ word into the $m^{th}$ time slot $(0 \leq k \leq j, \quad 0 \leq m \leq j)$, the gate numbers $N_g$ $(1 \leq N_g \leq 2j - 1)$ and the gating times $t_g$ $(0 \leq t_g \leq t_s - t_w)$ are determined as follows:

$$N_g = j + m - k \qquad (1)$$

and $$t_g = (k - 1)\, t_w. \qquad (2)$$

Thus, in Example II, $t_s = 1$ $\mu$sec, $t_w = 0.1$ $\mu$s (100 ns), and $j = 10$. In order to transfer the sixth word $W_6$ ($k = 6$) into the third time slot ($m = 3$) between 1.2 and 1.3 $\mu$s, equation (1) and (2) give $N_g = 7$ and $t_g = 0.5$ $\mu$s; that is, gate 20.7 is opened at $t = 0.5$ $\mu$s, where $t = 0$ is measured from the time word $W_1$ reaches a predetermined input point (e.g., the input of gates 20). Similarly, for the permutation of the other words.

It should also be noted that if an input frame is part of, say, a three minute telephone call, the designation of the gate number and gate timing remains fixed during the entire call inasmuch as these parameters would be a function of the telephone number of the called party.

The optical gates utilized in our time-slot interchanger may comprise, for example, an AlGaAs double heterostructure *p-n* junction phase modulator disposed between a pair of crossed polarizers as described by F. K. Reinhart in U.S. Pat. No. 3,748,597 (Case 2) issued on July 24, 1973. When using such a device, the electrical control pulses S1 would be applied along buses 24 as shown in FIG. 1. Alternatively, where picosecond gating times are desired, the optical gates 20 may comprise a medium (e.g., $CS_2$ or fused quartz) in which birefringence can be optically induced. As described by M. A. Duguay in U.S. Pat. No. 3,671,747 (Case 10) issued on June 20, 1972, such a medium is also disposed between a pair of crossed polarizers, but the control pulse S1 would be a high intensity, short duration, optical pulse generated by a laser source and applied at suitable times to the medium.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

Figure 4:
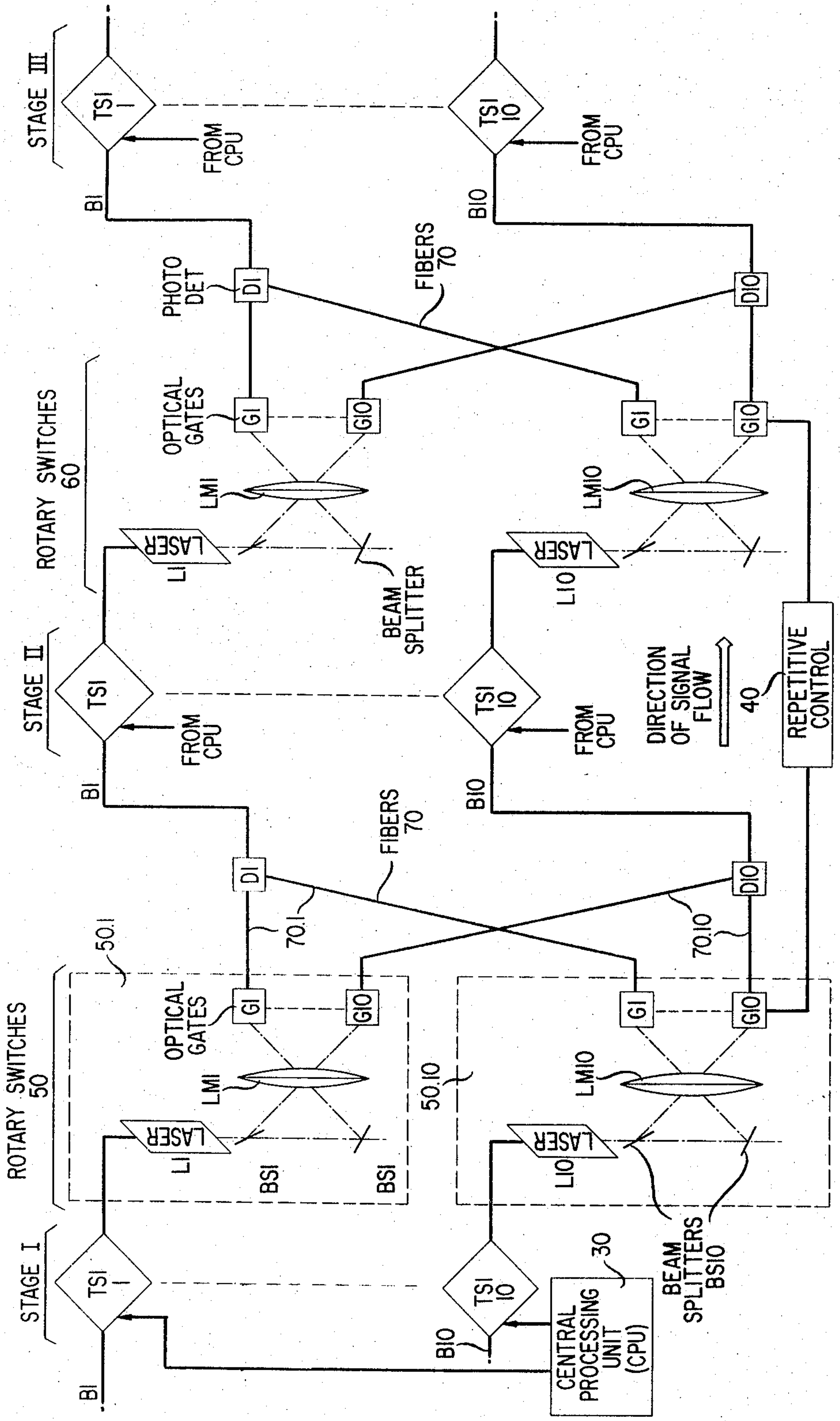
FIG. 4 is a block diagram of a switching network utilizing the time-slot interchanger of FIG. 1.

In particular, our time-slot interchanger (TSI) can be utilized as a building block for relatively large, wideband, optical time-division switching networks. FIG. 4 shows an arrangement of TSIs and rotary switches for realizing such a network for one hundred channels coded into ten streams of 10 word PCM frames. The network comprises three stages, I, II and III of TSIs with ten TSIs per stage. Each TSI is under external control from a memory 30, and each stage handles 10 buses B1...B10 with each bus carrying ten time-slots or words.

Interposed between adjacent stages are rotary switches which function as serial-to-parallel converters. More specifically, a plurality 10 of rotary switches 50 are interposed between stages I and II. in each rotary switch 50 the output of the $i^{th}$ TSI is used to drive a laser L, which regenerates the stream on input bus $B_i$. The output of laser $L_i$ is divided into a plurality (ten) of spatially separate optical signals (e.g., by tandem beam splitters $BS_i$) which are focused by lens means $LM_i$ onto separate ones of a plurality (ten) of optical gates G1...G10. In general, in each rotary switch 50 the $i^{th}$ optical gate $G_i$ is optically coupled to a photodetector $D_i$ at the input of the $i^{th}$ TSI of the next succeeding stage. For example, in the first rotary switch 50.1 of stage I, the output of optical gate G1 is coupled via a fiber 70.1 to a photodetector D1 at the input of TSI1 of stage II. In rotary switch 50.10, the output of gate G1 is also coupled through a fiber 70.1 to photodetector D1. Similarly, for gates G1 of intermediate rotary switches 50.2 to 50.9 (not shown).

A similar arrangement of rotary switches 60 is disposed between stages II and III. In both cases, the optical gates are under control of a repetitive control source 40 which cyclically opens the gates at predetermined times to effect the serial-to-parallel conversion of timeslots.

In operation, the ten PCM streams are put directly on the buses B1...B10 of stage I, and each passes through a TSI of the type shown in FIG. 1. Each TSI, under control of memory 30, permutes the words on its associated bus in accordance with a desired "talking" path to be established, e.g., in accordance with the called telephone number. Next, each time slot on a bus is distributed to a different bus of stage II (serial-to-parallel conversion) by a repetitive rotary switching action of rotary switches 50 as follows.

For $j = 1, 2,...10$, the electrical output of the $j^{th}$ TSI of stage I, is used to modulate laser $L_j$, the output of which is split into ten equal optical sub-signals by beam splitters $BS_j$. Each sub-signal is imaged through lens means $LM_j$ onto a separate optical gate G, the outputs of which are coupled through fibers 70 and photodetectors D to the TSIs of stage II as previously described. Under the control of source 40, the ten optical gates are opened cyclically for successive time slots and are so phased that the $i^{th}$ word of each frame on the $j^{th}$ bus $B_j$ passes through the $(i + j - 1)^{th}$ gate and onto the photodetector of the $(i + j - 1)^{th}$ bus of stage II; i.e., to the input of the $(i + j - 1)^{th}$ TSI of stage II, where $(i + j - 1)$ is an integer, modulo 10. The cycles of the optical gates for successive buses of stage I are successively one time slot ahead in phase so that bus $B_j$ of stage I is transmitting to bus $B_k$ of stage II if, and only if, bus $B_{(j+1)}$ of stage I is transmitting to bus $B_{(k+1)}$ of stage II, modulo 10. The effect of this cycling is to place the word in the $i^{th}$ time slot of bus $B_j$ of stage I into the $i^{th}$ time slot of bus $B_{(i+j-1)}$ of stage II, modulo 10. Each bus of stage II now passes through a TSI, then through another exacctly similar rotary optical distributing switch (i.e., rotary switches 60), as previously described, onto the buses of stage III. The buses of stage III are related to those of stage II in exactly the same way that those of stage II are related to those of stage I, except possibly for phase. Each bus of stage III now goes through a final TSI and the network description is complete.

It is apparent that a particular word entering stage I can be routed to any output of stage III by transfering that word to suitable time-slots in stages I, II and III under control of the CPU. Moreover, in this network once a call connection is established the switching path through the network remains the same for the duration of the call.

We claim:

1. In a time division multiplex communication system in which information is carried in the form of signal pulses in a plurality $j$ of time-wise sequential time slots or words on an input signal path, apparatus for permuting said words to produce a predetermined sequence of said words on an output signal path, comprising:

generating means for producing from each of said signal pulses a plurality of at least $(2j - 1)$ optical sub-pulses each propagating along spatially separate paths, a plurality of at least $(2j - 1)$ optical gates each disposed to receive a separate one of said sub-pulses, said gates being normally in an off-state which inhibits transmission of said sub-pulses therethrough, an array of at least $(2j - 1)$ optical fibers cut to different lengths so that the difference in length between functionally adjacent fibers is uniform, one end of each of said fibers being terminated in an input plane and the opposite end of each of said fibers being terminated in an output plane, each of said one ends of said fibers being in registration with a separate one of said gates, means for combining on said output signal path the optical sub-pulses emerging from the output plane of said array, and control means for applying to predetermined ones of said gates control signals effective to switch said gates to an on-state for a time period approximately equal to the duration of a time slot, said control signals being applied to said gates so that at prescribed times preselected words are coupled to preselected fibers, thereby to delay the sub-pulses in each of said words by a predetermined amount effective to permute said words and to produce said sequence on said output signal path.

2. The apparatus of claim 1 wherein:

said generating means comprises a laser responsive to said signal pulses for producing optical pulses corresponding thereto, a plurality of at least $(2j - 1)$ beam splitters arranged to receive said optical pulses and produce said sub-pulses by partial reflection therefrom, and lens means disposed to focus said sub-pulses onto the inputs of said optical gates.

3. The apparatus of claim 2 wherein:

said output path is an electrical path; and said combining means comprises photodetection means for receiving optical sub-pulses emerging from the output plane of said array and for converting said optical sub-pulses into electrical sub-pulses at the output of said photodetection.

4. The apparatus of claim 2 wherein:

said output path is an optical path, and said combining means comprises a plurality of reflectors positioned to receive optical sub-pulses emerging from the output plane of said array and oriented to reflect a portion of said sub-pulses collinearly along said output path.

5. The apparatus of claim 2 wherein:

said output path is an optical path, and said combining means includes a relatively large diameter optical fiber to which the outputs of the array fibers, being of relatively smaller diameter, are optically coupled.

6. The apparatus of claim 1 wherein:

said information is in the form of a coded frame of said signal pulses, said frame being of duration $t_s$ and containing $j$ words or time slots $W_1W_2...W_j$, each of duration $t_w$, and in order to transfer the $k^{th}$ word $W_k$ $(0 \leq k \leq j)$ on said input signal path into the $m^{th}$ time-slot $(0 \leq m \leq j)$ on said output signal path, said control means applies a control signal to the $N^{th}$ one of said gates $(1 \leq N \leq 2j - 1)$ at a time $t_g$ $(0 \leq t_g \leq t_s - t_w)$ given by $$N = j + m - k$$

and $$t_g = (k - 1)\, t_w.$$

7. In a time division multiplex communication system, a switching network for transferring the $i^{th}$ word on any one of $m$ input signal paths or buses to the $n^{th}$ time slot on any one of $m$ output signal paths or buses comprising:

at least three tandem stages I, II and III each including $m$ apparatuses according to claim 1 arranged in parallel with one another, at least two serial-to-parallel converters, one converter interposed between stages I and II and the other converter between stages II and III, each of said converters comprising a plurality $m$ of rotary switches arranged in parallel, each of said switches having a single input and $m$ outputs, the inputs of said apparatuses of stage I being coupled to separate ones of said $m$ input buses and the outputs of said apparatuses of stage III being coupled to separate ones of said $m$ output buses, the outputs of said apparatus of stages I and II being coupled to the inputs of separate ones of the next succeeding rotary switch and the outputs of each of said rotary switches being coupled to separate ones of the inputs of said apparatuses of the next succeeding stage as follows:

each of said rotary switches comprising:

a laser responsive to its associated apparatus according to claim 1 for generating optical pulses which are the analog of the permuted words appearing at the output of said apparatus, means for producing from each of said optical pulses a plurality $m$ of optical sub-pulses propagating along spatially separate paths, a plurality $m$ of optical gates normally in an off-state which inhibits the transmission of said optical sub-pulses therethrough, means for focusing said separate paths onto the inputs of separate ones of said gates, the $g^{th}$ $(g = 1, 2...m)$ gate of each rotary switch being coupled to the input to the $g^{th}$ apparatus of the next succeeding stage, and means interposed between said $g^{th}$ gate and said $g^{th}$ apparatus for converting the optical output of said gate into its electrical analog, and, control means for opening the optical gates of each rotary switch cyclically so that said $i^{th}$ word on the $j^{th}$ input bus of stage I ($j = 1, 2...m$) is transmitted through the $(i + j - 1)^{th}$ gate of the $j^{th}$ rotary switch to the input of the $(i + j - 1)^{th}$ apparatus of stage II, where $(i + j - 1)$ is an integer, modulo $m$, the cyclical opening of said gates for successive rotary switches of stage I being successively one word ahead in phase so that the $j^{th}$ bus of stage I is transmitting to the $k^{th}$ apparatus of stage II ($k = 1, 2...m$) if, and only if, the $(j + 1)^{th}$ bus of stage I is transmitting to the $(k + 1)^{th}$ apparatus of stage II, modulo $m$, so that the $i^{th}$ word of the $j^{th}$ bus of stage I is transferred into the $i^{th}$ time slot at the input of $(i + j - 1)^{th}$ apparatus of stage II, modulo $m$, stage II being related to stage III in the same manner that stage II is related to stage I so that said $i^{th}$ word is transferred into the $n^{th}$ time slot on said predetermined output of stage III.

* * * * *

UNITED STATES PATENT OFFICE
CERTIFICATE OF CORRECTION

PATENT NO. : 3,849,604

DATED : November 19, 1974

INVENTOR(S) : Vaclav E. Benes and Michel A. Duguay

It is certified that error appears in the above-identified patent and that said Letters Patent are hereby corrected as shown below:

Column 2, line 56, change "illustsration" to --illustration--.

Column 4, line 30, Example 1, 4th column should read --0.5 μs--.

Column 4, line 32, Example 1, 4th column should read --0.3 μs--.

Column 6, line 4, "in" should be --In--.

Column 6, line 60, change "exacctly" to --exactly--.

Column 7, line 60, after "photodetection" insert --means--.

Signed and sealed this 1st day of July 1975.

(SEAL)
Attest:

RUTH C. MASON
Attesting Officer

C. MARSHALL DANN
Commissioner of Patents
and Trademarks